Aug. 19, 1958 W. H. BEACH 2,848,601
DOUBLE LENS SYSTEM FOR SECURING EITHER SPOT OR FLOOD EFFECTS
Filed Dec. 14, 1955
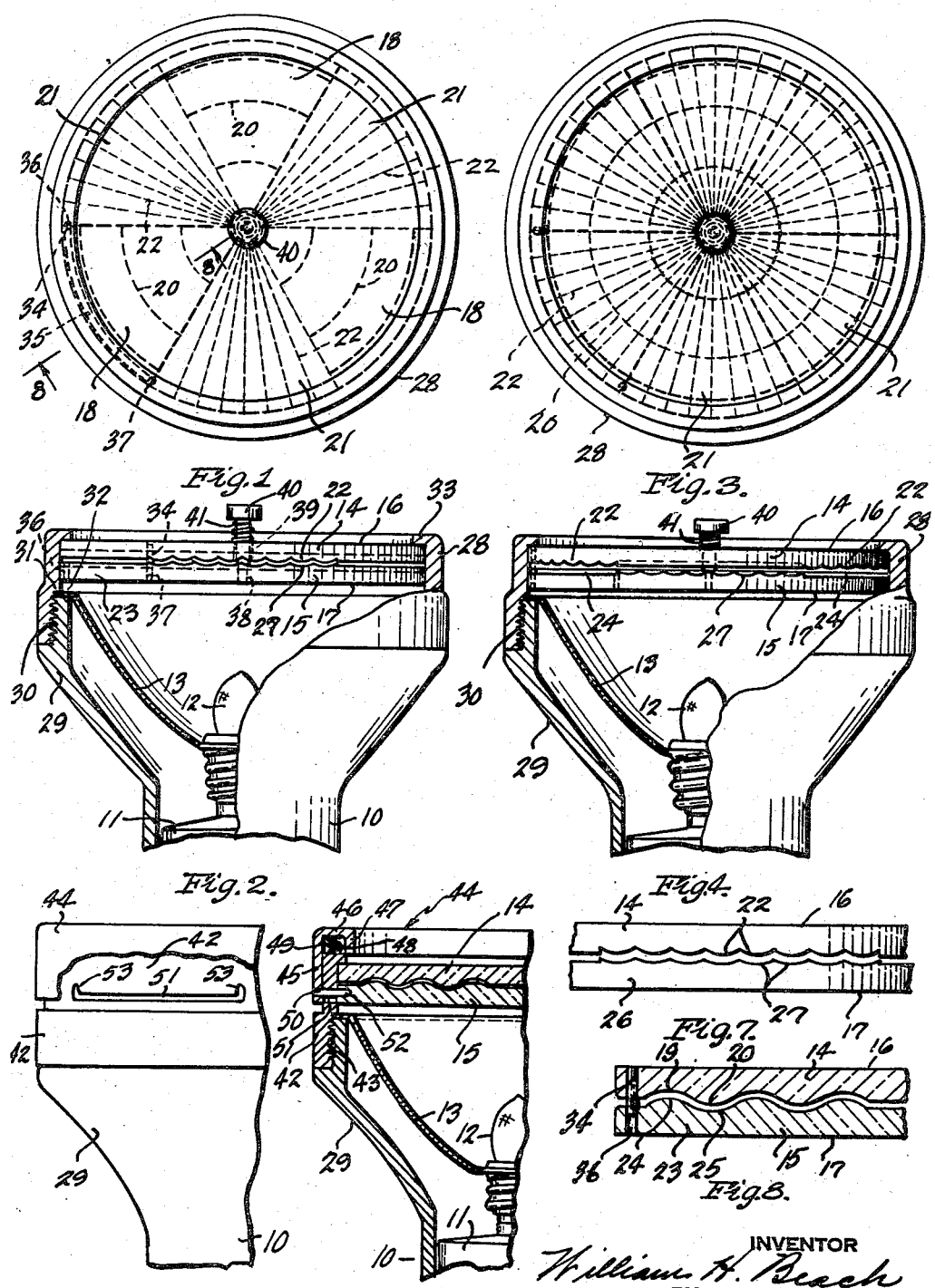
INVENTOR
William H. Beach
BY
Wooster & Davis
ATTORNEYS

United States Patent Office 2,848,601
Patented Aug. 19, 1958

2,848,601

DOUBLE LENS SYSTEM FOR SECURING EITHER SPOT OR FLOOD EFFECTS

William H. Beach, Fairfield, Conn., assignor to The Bridgeport Metal Goods Manufacturing Company, Bridgeport, Conn., a corporation of Connecticut Application December 14, 1955, Serial No. 553,082

3 Claims. (Cl. 240—106.1)

This invention relates to a lens system for securing either spot or flood lighting effects with spot light lanterns, flashlights or similar devices, and has for an object to provide a quick and efficient means of changing a spot light lantern, flashlight or the like to a flood light or spot light, so that the user may have either type of light readily available.

It is also an object to provide a device of this character in which there are a pair of lenses in superposed relation over the light and its reflector, each lens having on one side a light-diffusing surface or pattern, the diffusing surface of each lens including portions of different types of patterns, the patterns of one lens being a reverse of the other, and the lenses being mounted with means for turning one relative to the other to bring the reversed patterns in superposed relation to substantially cancel each other out and permit normal spot light transmission through the lenses, and also one lens may be turned to bring one type of pattern on one lens in superposed relation to the other type of pattern on the other lens, to secure normal and substantially uniform light diffusion from the light source for substantially uniform flood light effect.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a top plan view of the head end of a spot light flashlight showing a pair of lenses involving this invention in superposed relation and the reversed diffusion patterns of the two lenses in alignment so that they substantially cancel each other out to secure the normal spot light effect;

Fig. 2 is a partial side elevation and partial section thereof showing an edge view of the lenses;

Fig. 3 is a view similar to Fig. 1 showing one lens turned with respect to the other lens, bringing the different types of diffusion surfaces or patterns into superposed relation to secure normal light diffusion to secure substantially uniform illumination and flood light effect from the light source;

Fig. 4 is a partial side elevation and partial section of Fig. 3 showing an edge view of the lenses;

Fig. 5 is a partial section showing a modified means for turning one lens relative to the other;

Fig. 6 is a side elevation thereof looking from the left of Fig. 5 and with parts broken away to more clearly show the construction;

Fig. 7 is an edge view of superposed lenses indicating one portion of the diffusion patterns in superposed aligned or nested relation, and Fig. 8 is a transverse or radial section of a portion of the other types of patterns for the two lenses, also in superposed alignment or in effect nested relation, the section being substantially on line 8—8 of Fig. 1.

In the drawing the lens system is shown as applied to the flashlight type of spot light, but it is to be understood it may be used with other types of spot light and similar types of light sources, such as lanterns or similar devices. The flashlight shown comprises a body or shell 10 in which the batteries 11 are located supplying current to the light bulb 12 located at substantially the focal center of the parabolic reflector 13 or the usual spot light reflector, together with the usual switch control means for the lamp bulb (not shown). At the open side of the reflector and therefore over the light source is located this improved lens system for controlling the light passing from this light source including this reflector, for securing either the normal spot light effect or a diffused substantially uniform flood light effect, as desired by the user, with means whereby the user may easily and quickly shift from one type of illumination to the other as desired.

This system comprises a pair of preferably substantially flat lenses 14 and 15 placed closely together in superposed relation over the open side of the reflector 13 and the light bulb for transmission of the light therefrom, these lenses being of suitable transparent material, such, for example, as suitable glass or a suitable molded plastic material. Each lens has a plain surface 16 or 17 on one side, preferably substantially flat, and on the other side is provided with a light-diffusing surface comprising portions of different types of patterns for the diffusing effect, and the diffusion surface or pattern of one lens is the reverse of the other, so that when in alignment in superposed relation they substantially cancel out each other's light diffusion effect, giving a substantially clear glass effect and substantially noninterference with the transmission of the usual spot light beam, but when shifted to bring the different types of patterns of the two lenses in superposed relation they both have their normal light-diffusion effect to provide normal diffusion of the light from the source to produce the normal, substantially uniform illumination or flood light effect.

In the specific form of lens shown the diffusion or optical side surface is composed of a plurality of pairs of sectors, each pair composed of two light diffusion patterns, and the sectors are so arranged that the sectors with the different patterns are arranged alternately. In the specific lenses shown there are six sectors, or that is, three pairs, but there may be more or less than six provided. An even number of sectors is used in each lens. One pattern or type of diffusion surface for the alternate sectors 18 of one lens, in this case the outer or upper lens 14, is composed of concentric rings alternately concave and convex, forming alternate concave grooves and convex ribs preferably of the same curvature, as shown at 19 and 20 respectively, and in cross section these rings are arcs meeting tangentially, as shown in Fig. 8. The effect is a series of alternate plus and minus ring-shaped lenses with a smooth transmission from one arc to the other. Their effect is to open up the spot beam to a flood size beam determined by the radii of the lenses.

The second set of sectors 21 of this lens, of substantially the same width as and arranged alternately with and between the sectors 18, is composed of a series of radial lenses 22, the cross section of each being a true arc of optically suitable size, these radial lenses in the upper lens 14 being transversely convex in the form shown, as indicated in Fig. 7. These sectors have a light-diffusing action at right angles to the action of the concentric rings of the sectors 18.

The other or lower lens 15 has a light-diffusing surface arranged closely adjacent and in opposed relation to the light diffusing surface of the upper lens, but the diffusion patterns of this lower lens are substantially the exact reverse of the patterns of the upper lens. Thus the sectors 23 of this lower lens having the concentric transversely curved or alternately convex and concave rings 24 and 25 are the same size and shape as the alternate concave and convex rings 19 and 20 of the upper lens, and meet tangentially, the same as those of the other lens, but when in alignment, as shown in Fig. 8, the convex rings or ribs 24 are opposite the concave portions or grooves 19 of the other lens, while its concave portions or grooves 25 are opposite the convex portions or ribs 20 of the other lens. Thus in this position they substantially cancel each other out or neutralize their light diffusion effects, giving a substantially clear glass effect in these sectors.

The alternate sectors 26 of this lower lens are also composed of a series of radial lenses 27, the cross section of each being also a true arc of optically suitable size of the same width and curvature as the radial lenses 22 of the upper lens, except that they are transversely concave, as shown in Fig. 7. These sectors have a light diffusing action at right angles to the action of the concentric rings 24 and 25, the same as in the upper lens, but when arranged with these concave lenses 27 in alignment and superposed relation with the convex lenses 22 of the upper lens, thus providing minus and plus lenses in alignment, they substantially cancel each other out or neutralize each other's light diffusing effect, also giving a substantially clear glass effect through the two lenses, the same as secured with the aligned concentric ring sectors 18 and 23. Thus when the two lenses are in superposed relation with the similar types of patterns in their light diffusion surfaces in alignment or substantially nested relation, as indicated in Figs. 1, 2, 7 and 8, the optical pattern or light diffusion surfaces substantially neutralize or cancel each other out so that the effect is substantially a clear glass for light transmission from the light source through the lenses, permitting transmission of the usual spot light effect from the light source comprising the light bulb and the associated reflector. However, when one lens is turned a partial revolution with respect to the other lens, as shown in Figs. 3 and 4, to bring the sectors with the radial lenses of one lens over or in superposed relation to the concentric ring sectors of the other lens, as the light diffusion effects of the two superposed sectors are thus at right angles to each other, both lenses have their normal light diffusion effect, permitting normal light diffusion of the beam from the light source and securing substantially flood light effect or illumination.

Differing means may be provided for mounting these lenses over the light source comprising the lamp bulb and its reflector. The lenses are located over the open side of the reflector in superposed relation and closely adjacent each other. In the arrangement shown, one of these lenses, in the present case the upper or outer lens 14, is shown as mounted in fixed relation in its support, while the other lens, in this case the inner or lower lens 15, is mounted for limited turning movement relative to the other lens, the movement being a partial revolution equivalent to the widths of the different sectors comprising the concentric ring type of lenses and the radial types, so that by this partial turning of the inner lens the user may easily and quickly bring the lenses into the position with the similar types of sector patterns in alignment, as in Figs. 1, 2, 7 and 8, for the clear glass or spot light effect, or into position with the different type patterns of the alternate sectors in alignment, as shown in Figs. 3 and 4, for the uniform illumination or flood light effect.

In the arrangement of Figs. 1 to 4, the lenses are mounted in a ring cap 28 having threaded engagement with the open upper end of the head 29 of the flashlight, as indicated at 30, and provided with a shoulder 31 for clamping the peripheral flange 32 on the outer open edge of the reflector 13 against the end of the head 29 to mount this reflector therein, the ring 28 having at its outer edge a flange 33 extending over the edge of the outer lens. The inner or lower lens 15 is mounted between the outer lens 14 and the end of the reflector 13, the outer lens 14 being stationary while the inner lens 15 has a loose sliding and turning fit in the ring 28, the ring 28 being long enough so that the lens 15 may have sufficient longitudinal or sliding movement to permit release of a securing means for holding the lens 15 in the two positions with either the concentric ring sectors of the two lenses in alignment or the radial lens sectors in alignment with the concentric ring sectors. Suitable means may be provided for this purpose. In the form of Figs. 1 to 4, the upper lens is provided with a downwardly extending lug or pin 34 in its under side projecting at its lower end into a curved groove 35 in the top of the lower lens extending between two openings or recesses 36 and 37 in this lens. Mounted at its lower end 38 in the lower lens is an upright pin 39 extending through the upper lens and provided at its upper end with a finger grip 40 above the upper lens and spaced therefrom, with a coil spring 41 embracing this stem between the head 40 and the lens 14, thus acting to shift this pin and the lens 15 upwardly, and with either opening or recess 36 or 37 seated over the pin 34 to thus releasably hold the lens 35 in either one of the two positions. To shift from one position to the other all that is necessary is to push downwardly on the finger grip 40, thus sliding the lens 15 downwardly to release it from the pin 34 and then turn it to the other position to permit the spring 41 to shift it upwardly and seat the pin 34 in the corresponding recess 36 or 37.

A slightly different arrangement is shown in Figs. 5 and 6. In this case, instead of having a hand grip 40 in the center of the lenses, a double ring arrangement is shown comprising an inner ring 42 similar to the ring 28 in which the two lenses 14 and 15 are mounted, the same as in the first form, and this ring is threaded to the upper end of the head of the flashlight, as indicated at 43. Embracing the outer end of this ring is a second ring 44 having an outer portion 45 telescoped over the outer side of the ring 42 for longitudinal and turning movements thereon, and it has an inwardly and downwardly turned flange 46, 47 providing a channel 48 in which are mounted any suitable number of coil springs 49, between the bottom of this channel and the edge of the ring 42, tending to shift the ring 44 outwardly. This ring carries a pin 50 extending through a slot 51 in the side of the ring 42 with its inner end 52 seating in a recess in a side edge of the lens 15. Upwardly extending recesses 53 are provided in the opposite ends of slot 51, these recesses being so located that when the lens 15 is turned to permit the pin 50 to seat in either one of these recesses, the lens 15 is in either one of its two positions of either Fig. 1 or Fig. 2. To shift the lens from one position to the other all that is necessary is to push downwardly on the ring 44 sufficiently to carry the pin 50 from the notch 53 in which it happens to be located, and then turn the ring 44 to carry the pin 50 along the slot 51 and turn the lens 15 to the other position, after which release of pressure on the ring 44 will permit the springs 49 to shift it upwardly and seat the pin 50 in the other notch 53 to retain the lens in its new position.

It will be clear from the above that this construction and arrangement provides a lens system for spot lights, lanterns, flashlights or similar types in which the lighting effect may by a simple operation be easily and quickly changed by the user to secure either a normal spot light effect or a normal and substantially uniform diffusion or flood light effect for substantially uniform illumination.

Having thus set forth the nature of my invention I claim:

1. A lens system adapted for both spot and flood lighting from a light source and reflector at one side of the system, comprising a pair of superposed circular lenses arranged to be turned one relative to the other about a common central axis, both lenses being plain on one side and provided with a light diffusion pattern on the other, the diffusion side of each lens comprising a plurality of pairs of sectors of a circle composed of two different types of diffusion patterns arranged alternately and the diffusion pattern of one lens being the reverse of the other, the diffusion pattern of one sector of each pair of both lenses comprising circular alternate convex and concave lenses, and the alternate sector of each pair of one lens comprising radial convex lenses, while the alternate sector of each pair of the other lens comprises radial concave lenses whereby when reversed patterns are superposed they substantially cancel out each other with greatly reduced light diffusion for spot light effect and when one lens is turned to a position where on type of pattern is superposed over the other type a substantially circular uniform diffusion of the light for flood lighting effect is secured.

2. A lens system adapted for both spot and flood lighting from a light source and reflector at one side of the system, comprising a pair of superposed circular lenses arranged to be turned one relative to the other about a common central axis, each lens being plain on one side with a light diffusion surface on the other, the diffusion side of each lens comprising a plurality of pairs of sectors of a circle composed of two different diffusion patterns arranged alternately and the diffusion patterns of one lens being the reverse of the other, the diffusion pattern of one sector of each pair of both lenses comprising circular alternate convex ridges and concave grooves between them and the alternate sector of each pair of one lens comprising radial convex ridges, while the alternate sector of each pair of the other lens comprises radial concave grooves whereby when the lenses are arranged with the reversed patterns superposed they substantially cancel out each other with greatly reduced light diffusion leaving a substantially normal spot pattern from the light, and when one lens is turned to a position where one diffusion pattern is superposed over the other diffusion pattern a substantially normal diffusion of the light is secured for flood lighting effect.

3. A lens system adapted for both spot and flood lighting from a light source and reflector at one side of the system comprising a pair of superposed circular lenses arranged to be turned one relative to the other about a common central axis, each lens having a plain surface on one side and a light diffusion surface on the other comprising an even number of alternately arranged sectors of a circle, the diffusing surface of one set of alternate sectors on each lens comprising alternate circular concentric convex ridges and concave grooves with the arcs of adjacent ridges and grooves merging into each other and with the ridges and grooves of the corresponding sectors of the two lenses being reversed, the diffusing surface of the other alternate sectors of one lens each comprising a series of radially extending transversely convex ribs, and the corresponding sectors of the other lens comprising radially extending transversely concave grooves of substantially the same curvature as the convex ribs of the first lens.

References Cited in the file of this patent

UNITED STATES PATENTS

| 1,869,276 | Precourt | July 26, 1932 |
| 2,712,060 | Johnson | June 28, 1955 |

FOREIGN PATENTS

| 587,609 | France | Apr. 21, 1925 |
| 606,316 | France | June 11, 1926 |
| 701,365 | Germany | Jan. 15, 1941 |